3,346,446
HYPOIODOUS ACID GENERATING COMPOSITIONS
Frank J. Zsoldos, Jr., 25—63 33rd St.,
Astoria, N.Y. 11102
No Drawing. Filed Oct. 4, 1963, Ser. No. 313,740
The portion of the term of the patent subsequent to
Aug. 9, 1983, has been disclaimed
7 Claims. (Cl. 167—17)

This invention relates to improved compositions effective for generating hypoiodous acid.

Various hypoiodous acid generating systems have heretofore been proposed wherein the production of hypoiodous acid is incidental to providing various amounts of diatomic iodine, which, of course, has recognized germicidal activity for various purposes. One such composition which has previously been proposed is that disclosed in Patent No. 2,904,474. Such compositions containing diatomic iodine, when produced, have satisfactory germicidal activity. However, compositions which thus rely on the presence of diatomic iodine have as a necessary incident the major disadvantages of elemental iodine, namely, color, odor and corrosiveness. Accordingly such a composition as that proposed in the patent referred to is useful only where the color and odor of elemental iodine is not objectionable and where the aqueous preparation is to be used and discarded in a matter of a few minutes, such as in oral or surgical rinses. While the generation of hypoiodous acid is mentioned in Patent No. 2,904,474, its generation is for the prime purpose of utilizing it as a regenerant for the desired content of diatomic iodine and the compositions disclosed lose their hypoiodous acid content in only a matter of minutes.

It is a principal object of the present invention to provide a germicidal composition which will remain stable over long periods of time both when stored and when in actual use and wherein the germicidal effectiveness is imparted by hypoiodous acid.

A further object of this invention is to provide an odorless and colorless and strong germicidal action in alkaline solutions.

A still further object of this invention is to provide a composition having the improved properties aforesaid which is relatively low in cost and the components of which are readily available.

As illustrative of the application of the compositions of this invention, reference may be made to use thereof as a swimming pool sanitizer and as a solution for use as a final rinse in restaurants. For such uses the solution must be free of diatomic iodine or other form of elemental iodine, which has the disadvantages mentioned above, and must be one wherein the hypoiodous acid content is sufficiently stable so that effective germicidal action may be provided therefor over a period of 8 to 10 hours without decomposition to form elemental iodine. To the extent compositins having germicidal action based on the presence of hypoiodous acid may be stabilized so as to retain effective germicidual action without reverting to elemental iodine, the fields of commercial utility and acceptance are widened.

According to the present invention, the production of hypoiodous acid generating compositions having improved stability is based on the discovery that in the case of the particular oxidant for metallic iodide or elemental iodine, i.e., 1,3-dichloro-5R,5R'-hydantoin, having the formula:

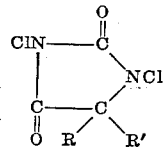

wherein R and R' represents any alkyl radical or hydrogen, the stability of the hypoiodous acid which may be produced against decomposition to form diatomic iodine is greatly increased under the controlled conditions herein described by the presence of unchlorinated hydantoin, namely, 5R,5R'-hydantoin represented by the formula:

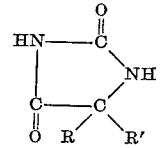

wherein R and R' represent any alkyl radical or hydrogen. Preferably R and R' are lower alkyl radicals, namely, radicals containing from 1 to 5 carbon atoms.

The amount of unchlorinated substituted or unsubstituted hydantoin which is present may be widely varied. The ratio by weight of the unchlorinated hydantoin to the dichloro-hydantoin should be at least 1:20. The upper limit of the unchlorinated hydantoin compound is not critical and any amount may be present, although as a practical matter no more ordinarily is used than that which is desirable inasmuch as it would be uneconomical to use larger amounts than that which is necessary for effectiveness.

Other essential ingredients of the composition of this invention are an iodine-containing substance selected from the group consisting of non-toxic metallic iodide and elemental iodine and a suitable buffer for maintaining the pH of the solution not under 7.1 and not over 8.6. The minimum ratio in parts by weight of the dichloro-hydantoin to the iodine contained in the iodine-containing substance computed as mono-atomic iodine is at least 3:1. Much larger excesses may be used and while there is no critical upper limit in this regard it becomes uneconomical to use an amount of dichloro-hydantoin such that the ratio is greater than 120:1.

Due to the extraordinary bactericidal effectiveness of aqueous solutions of hypoiodous acid, bactericidal effectiveness can be obtained when the concentration of hypoiodous acid is as low as 0.2 part per million. The concentration of hypoiodous acid should not exceed 30 parts per million and preferably does not exceed 10 parts per million. Depending on the extent of swimming pool usage, it is desirable that concentrations of hypoiodous acid in connection with such usage be between 1 and 2 parts per million for an extensively used pool and somewhat less than 1 part per million for a pool that is used only by a few swimmers. Accordingly, the content of metallic iodide or iodine that is used should be such as to form hypoiodous acid concentrations of the order mentioned calculated on the basis of complete conversion thereof to hypoiodous acid. The dichloro-hydantoin and the unchlorinated hydantoin are water-soluble so as to occur in aqueous solution. The compounds ordinarily used are readily soluble. However, the requirements for solubility are low as a corollary of the fact that hypoiodos acid possesses bactercidal effectiveness at the very low concentration hereinabove mentioned. Thus, in order to maintain the minimum ratio of dichloro-hydantoin to iodine-containing substance computed as mono-atomic iodine at the value of 3:1 when the HOI concentration is only 0.2 part per million, only 0.6 part per million of the dichloro-hydantoin is required, namely, a value so low as to be associated with substances that commonly are regarded as water-insoluble. However, the ordinarily available and preferable dichloro-hydantoin and un- chlorinaed hydantoin which may be used in the practice of this invention are readily soluble. Preferably the solution concentrations are such that said ratio is of the order of 7:1 and 10:1.

The practice and significance of this invention will now be illustrated in connection with the following examples wherein the parts are given by weight.

Example 1

A uniform mixture was prepared by mixing the following ingredients together in the dry state:

| | Parts |
|---|---|
| 1,3-dichloro-5,5-dimethyl-hydantoin | 68 |
| 5,5-dimethyl-hydantoin | 22 |
| Potassium iodide | 10 |

The foregoing mixture was dissolved in water to provide a 0.1% solution at a pH of 8 provided by sodium bicarbonate as buffer. The solution thus prepared was held for several days at room temperature and throughout the period of tests the solution was completely colorless and with no characteristic iodine odor. The hypoiodous acid concentration in the solution was determined from time to time with the results shown in the following table:

| Time: | HOI p.p.m. |
|---|---|
| Start | 5.6 |
| 30 mins. | 3.7 |
| 1 hr. | 1.9 |
| 2 hrs. | 1.0 |
| 3 hrs. | 0.4 |
| 4 hrs. | 0.4 |
| 20 hrs. | 0.4 |
| 70 hrs. | 0.3 |
| 95 hrs. | 0.2 |

The final concentration at the end of 95 hours was found to be bactericidally effective against *Escherichia coli* micro-organisms with contact times of about a few minutes.

In the foregoing example the hypoiodous acid concentration was determined by adapting the benzidine test for hypoiodous acid as described in Feigl's "Spot Tests." A portion of a 25-fold dilution of the test solution is placed in a cuvette and two drops of 1% benzidine in dilute acetic acid is added. The solution in the cuvette is stirred and immediately placed in a recording spectrophotometer wherein the optical density at 610 mμ is determined as a function of time. The peak value, ordinarily reached within a minute, is used to calculate the hypoiodous acid concentration from a calibration curve. The calibration curve referred to is prepared by dissolving a known amount of iodine in a solution maintained at a pH of 7 by a buffer. Dilutions of this solution are tested by the benzidine method for the hypoiodous acid which is produced as the result of the hydrolysis of the iodine. A K of $0.3 \times 10^{-12}$ is known in the literature for the reaction:

$$I_2 + H_2O \leftrightarrow HOI + I^- + H^+$$

Using the foregoing equilibrium constant, the concentration of HOI is calculated. One microgram per milliliter of HOI yields an optical density at 610 mμ of 0.500.

Example 2

To each of the two glass containers containing 4 liters of distilled water there was added a quantity of sodium carbonate sufficient to maintain a pH of 8. Two grams of 5,5-dimethyl-hydantoin were added to container #1, but not to container #2. Each container was then charged with 0.1 gram of 1,3-dichloro-5,5-dimethyl-hydantoin and 0.01 gram of potassium iodide. The solutions produced were in each instance colorless and odorless. The hypoiodous acid concentrations were determined colorimetrically as in the preceding example and the results were tabulated below:

Container #1

| Days: | p.p.m. |
|---|---|
| 1 | 2.0 |
| 2 | 2.0 |
| 3 | 2.0 |
| 4 | 2.0 |
| 5 | 1.6 |
| 6 | 1.2 |
| 7 | 0.6 |
| 8 | 0.6 |

Container #2

| Days: | p.p.m. |
|---|---|
| 1 | 0.1 |
| 2 | 0.05 |
| 3 | 0 |
| 4 | 0 |
| 5 | 0 |
| 6 | 0 |
| 7 | 0 |
| 8 | 0 |

The striking effect produced by the inclusion of the unchlorinated hydantoin in container #1 is apparent from the foregoing table.

Example 3

Two large vats of water containing 50 liters each were adjusted to pH 8 with sodium carbonate. To vat #1 there was added .24 gram of the mixture of Example 1, namely, the mixture of 68 parts by weight of 1,3-dichloro-5,5-dimethyl-hydantoin, 22 parts of 5,5-dimethyl-hydantoin and 10 parts of potassium iodide. To vat #2 there was added a like amount of a similar mixture except that the unchlorinated dimethyl-hydantoin was omitted and was replaced by an inert diluent, namely, sodium sulphate. The hypoiodous acid content was determined from time to time and to each of the vats 0.06 gram of the mixture was added after 24 hours had elapsed. The results of this experimental work are set forth in the following table:

TABLE 3

| Vat #1 | | | Vat #2 | | |
|---|---|---|---|---|---|
| Time | Feed, gm. | P.p.m. | Time | Feed, gm. | P.p.m. |
| Start | 0.48 | | Start | 0.48 | |
| 2 hrs. | | 0.6 | 2 hrs. | | 0.4 |
| 5 hrs. | | 0.6 | 5 hrs. | | 0.1 |
| 24 hrs. | | 0.6 | 24 hrs. | | 0.0 |
| | 0.06 | | | 0.06 | |
| 26 hrs. | | 0.8 | 26 hrs. | | 0.1 |
| 48 hrs. | | 0.6 | 48 hrs. | | 0.0 |

The data shown in the foregoing table indicates that the unchlorinated dimethyl-hydantoin exercises a specific stabilizing influence going beyond such influence as may be due merely to the presence of a filler or diluent.

Example 4

The mixtures used in treating vats #1 and #2 as set forth in Example 3 were used to treat two similar residential swimming pools containing 20,000 gallons of water each. The hypoiodous acid residuals in this case were determined only once for each 24-hour period. Each pool had one or two swimmers per day. The hypoiodous acid content was determined using a test kit whose accuracy had previously been checked against the spectrophotometric procedure hereinabove described in connection with Example 1. In each instance the pool water was maintained at a pH of 8. The hypoiodous acid concentration in each of the two pools is given in the following table:

TABLE 4

| Swimming Pool #1 | | | Wwimming Pool #2 | | |
|---|---|---|---|---|---|
| Time | Feed, ozs. | P.p.m. | Time | Feed, ozs. | P.p.m. |
| Start | 16 | | Start | 16 | |
| 1 day | 16 | 0.05 | 1 day | 16 | 0.0 |
| 2 days | 16 | 0.2 | 2 days | 16 | 0.0 |
| 3 days | 16 | 0.6 | 3 days | 16 | 0.0 |
| 4 days | 16 | 0.6 | 4 days | 16 | 0.0 |

In addition to the specific chlorinated and unchlorinated hydantoins exemplified hereinabove, other specific examples of chlorinated hydantoins wherein the total number of carbon atoms in the radicals R and R' as hereinabove defined is 5 or less which may be used in accordance with this invention are 1,3-dichloro-5-methyl-5-ethylhydantoin; 1,3-dichloro-5,5-diethyl-hydantoin; 1,3-dichloro-5-methyl-5-isobutyl-hydantoin; 1,3-dichloro-hydantoin; and 1,3-dichloro-5,5-pentamethylene spiro hydantoin. The special stabilizing effects disclosed herein appear to be specific to the class of hydantoins disclosed herein.

While this invention has been described as involving a certain minimum ratio relationship of unchlorinated hydantoin in relation to dichloro-hydantoin, it is not necessarily the case that these substances remain without interaction whereby some of the dichloro compound may be converted to monochloro-hydantoin and the unchlorinated hydantoin may be converted from its unchlorinated state to the monochloro-hydantoin. Accordingly, the content of dichloro and unchlorinated hydantoins referred to hereinabove and as set forth in the claims provides a basis for setting forth the molar chlorine content of the mixture. Thus it is within the practice of this invention to utilize a previously prepared monochloro-hydantoin inasmuch as the monochloro-hydantoin corresponds with the use of equal molar amounts of a dichloro-hydantoin and its unchlorinated counterpart. Moreover, it also is within the practice of this invention to employ a dichloro-hydantoin and add a sufficient quantity of a reducing agent such as sodium sulphite or sulphide or thiosulphate to produce sufficient of the unchlorinated hydantoin to be effective in accordance with this invention. However, it is essential that the composition be such that the ratio by weight of hydantoin expressed as unchlorinated hydantoin be at least 1:20 in relation to chlorinated hydantoin expressed as dichloro-hydantoin. In this connection it may be further noted that the stabilization effect is not directly related to molar equivalency as between dichloro-hydantoin and unchlorinated hydantoin inasmuch as it has been shown in connection with Example 3 that the use of a relatively small amount of the unchlorinated hydantoin has a very pronounced stabilizing effect when caused to be present according to this invention.

The precise mechanism whereby the hypoiodous acid which is generated possesses greater stability in the presence of the unchlorinated hydantoin is not fully understood. While dichloro-hydantoin and unchlorinated hydantoin may to a certain extent react in a water solution to produce monochloro-hydantoin which, as such, has greater stability than the dichloro-hydantoin, nevertheless, the experimental data indicates that the stabilizing effect under consideration according to the present invention is concerned with stability of the sensitive compound hypoiodous acid which is generated and that very substantial stability can be afforded even though relatively small amounts of the order of 5% of unchlorinated hydantoin may be present. The increased stability of the hypoiodous acid which is generated under the conditions specified herein may result from the reaction of the unchlorinated hydantoin with the nitrogen trichloride released by the action of the dichloro-hydantoin upon its solution. The presence of nitrogen trichloride resulting from decomposing solutions of dichloro-hydantoin is known in the art. Thus it is possible that any nitrogen trichloride which may be produced in this manner is effectively prevented from attacking the hypoiodous acid concentration which is originally produced so as to convert it into an inert iodate. Another hypothesis for the phenomenon which occurs according to this invention may be postulated on the possibility of the unchlorinated =N·H hydantoin groups exercising a repressing effect which probably inhibits the hydrolysis of the N-chloro-hydantoins, thereby diminishing their tendency to oxidize hypoiodous acid to iodine. However, regardless of theory of the action which takes place, nevertheless it has been ascertained according to this invention that under the conditions disclosed the presence of the unchlorinated hydantoin exercises a very pronounced inhibiting effect on the gross loss of hypoiodous acid that is generated by the reactive components initially included in the solution.

The substance comprising iodine which may be used in the practice of this invention ordinarily is potassium iodide inasmuch as this iodide is non-toxic and is readily available and less costly than other iodides. However, other non-toxic, water-soluble metallic iodides may be used such as the iodides of sodium, lithium, calcium or ammonium. Crystalline iodine also can be used in the practice of this invention, although this does not represent preferred practice.

It is important that the composition when in the form of an aqueous solution be maintained at a pH between 7.1 and 8.6. The maintenance of a pH between these limits may be obtained by the use of alkaline buffers, which may be selected from a wide variety as long as the buffer is substantially non-toxic. For optimum hypoiodous acid production it is preferred that the pH be maintained between 7.8 and 8. If the pH is too high, the excessive alkalinity results in increasing the rapidity of the decomposition of the hypoiodous acid that is generated. The rate of decomposition becomes excessive at a pH above 8.6. The control as to minimum pH is equally critical in that the hydrolysis of elemental iodine to hypoiodous acid is a contributing factor to the generation of hypoiodous acid utilizing the composition of this invention. At pH levels below 7.1 this hydrolysis becomes excessively low. Another factor pertinent to pH control is that if the pH were to be above 8.6 the non-corrosive nature of the compositions of my invention would be to some extent impaired.

While a wide variety of alkaline buffers may be used in the practice of this invention, those which are preferably employed are the salts of alkali metals and ammonia with a weak inorganic or aliphatic organic acid such as carbonic, bicarbonic, silicic, boric, acetic and formic acids. If desired, a mixture of two or more buffers may be used.

One of the advantages of this invention is that the ingredients which are essential to the practice thereof may be prepared in the form of a product in the dry, solid state which merely has to be added to water to produce an aqueous germicidal composition. This invention is applicable to the composition, whether in the aqueous composition state or in the dry, solid state. For producing the composition in the aqueous solution state it is not essential to premix the ingredients in that, if desired, they may be added one at a time to a body of water. However, it is preferable to premix the essential ingredients so that they are in the right relative proportions. This is particularly the case with regard to the mixture of dichloro-hydantoin, unchlorinated hydantoin and the iodine-containing substance. For some purposes it may be more convenient to add a buffer such as sodium bicarbonate separately so as to provide the desired pH control.

While this invention has been described in connection with certain examples, it is to be understood that the practice thereof may be varied in accordance with the principles that have been set forth and described herein.

I claim:

1. An aqueous germicidal composition containing in solution a mixture of 1,3-dichloro-5R,5R'-hydantoin having the formula (Formula A):

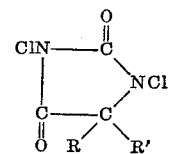

wherein R and R' represent hydrogen or any alkyl radical having 1 to 5 carbon atoms with the total of carbon atoms in R and R' not more than 5 and 5R,5R'-hydantoin having the formula (Formula B):

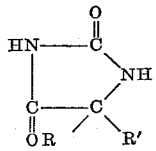

wherein R and R' represent hydrogen or any alkyl radical having 1 to 5 carbon atoms with the total of carbon atoms in R and R' not more than 5, the minimum ratio by weight of said hydantoin having Formula B to said dichloro-hydantoin having Formula A being 1:20, an iodine-containing substance selected from the group consisting of elemental iodine and non-toxic metallic iodides, and a non-toxic buffer effective to maintain the pH of said composition between 7.1 and 8.6, the minimum ratio by weight of said dichloro-hydantoin to iodine comprised in said iodine-containing substance computed as mono-atomic iodine being 3:1.

2. The aqueous germicidal composition of claim 1 wherein said iodine-containing substance is a non-toxic metallic iodide, and wherein said buffer is selected from the group consisting of salts of alkali metals and ammonium with the acids carbonic, bicarbonic, silicic, boric, acetic, and formic.

3. An aqueous germicidal composition according to claim 1 wherein said dichloro-hydantoin of Formula A is 1,3-dichloro-5,5-pentamethylene spiro hydantoin, wherein said hydantoin of Formula B is 5,5-pentamethylene spiro hydantoin and wherein said iodine-containing substance is elemental iodine.

4. A solid composition adapted to be dissolved in water to form a germicidal solution of hypoiodous acid having substantial stability at a pH between 7.1 and 8.6 which comprises a mixture of 1,3-dichloro-5R,5R'-hydantoin having the formula (Formula A):

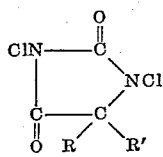

wherein R and R' represent hydrogen or any alkyl radical having 1 to 5 carbon atoms with the total of carbon atoms in R and R' not more than 5 and 5R,5R'-hydantoin having the formula (Formula B):

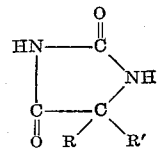

wherein R and R' represent hydrogen or any alkyl radical having 1 to 5 carbon atoms with the total of carbon atoms in R and R' not more than 5, the minimum ratio by weight of said hydantoin having Formula B to said dichloro-hydantoin having Formula A being 1:20, and an iodine-containing substance selected from the group elemental iodine and non-toxic metallic iodides, the minimum ratio by weight of said dichloro-hydantoin to iodine contained in said iodine-containing substance computed as mono-atomic iodine being 3:1.

5. The solid composition according to claim 4 wherein said composition contains an alkaline buffer which is adapted to impart a pH between 7.1 and 8.6 when said composition is added to water and which is selected from the group consisting of salts of alkali metals and ammonia with the acids carbonic, bicarbonic, silicic, boric, acetic and formic.

6. A solid composition according to claim 5 wherein said iodine-containing substance is a non-toxic metallic iodide.

7. A solid composition adapted to be dissolved in water to form a germicidal solution of hypoiodous acid which comprises 1,3-dichloro-5,5-dimethyl-hydantoin, 5,5-dimethyl-hydantoin, potassium iodide and sodium bicarbonate, the minimum ratio of 5,5-dimethyl-hydantoin to 1,3-dichloro-5,5-dimethyl-hydantoin being 1:20, the ratio by weight of said 1,3-dichloro-5,5-dimethyl-hydantoin to iodine contained in said potassium iodide computed as mono-atomic iodine being at least 3:1, and said composition when dissolved in water being adapted to impart thereto a pH between 7.1 and 8.6.

References Cited
UNITED STATES PATENTS

| | | | |
|---|---|---|---|
| 2,817,621 | 12/1957 | Marks et al. | 167—17 |
| 2,904,470 | 9/1959 | Berliner et al. | 167—58 |
| 3,136,716 | 6/1964 | Kitter | 167—17 |
| 3,161,588 | 12/1964 | Zsoldos | 210—64 |

OTHER REFERENCES

Petterson et al.: Journal of Organic Chemistry, vol. 24, No. 10, pp. 1414–1419, October 1959.

The Merck Index, 7th ed., published by Merck and Co., Inc., Rahway, N.J., 1960, p. 345.

LEWIS GOTTS, *Primary Examiner.*

JULIAN LEVITT, *Examiner.*

R. HUFF, *Assistant Examiner.*